US007014799B2

(12) United States Patent
Yang et al.

(10) Patent No.: US 7,014,799 B2
(45) Date of Patent: Mar. 21, 2006

(54) METHOD OF FORMING MESOSCOPICALLY STRUCTURED MATERIAL

(76) Inventors: Peidong Yang, 3001 Derby St., Apt. P, Berkeley, CA (US) 94705; Tao Deng, 339 Washington St., Somerville, MA (US) 02143; George M. Whitesides, 124 Grasmere St., Newton, MA (US) 02158; Galen Stucky, 973 W. Campus Ln., Goleta, CA (US) 93117; Dongyaun Zhao, Department of Chemistry Fudan University, Shanghai 200433 (CN); Bradley Chmelka, 933 W. Campus Ln., Goleta, CA (US) 93117; David Pine, 1037 St. Mary's Ln., Santa Barbara, CA (US) 93111; Pingyun Feng, 6925 Phelps Rd., Apt. 22, Goleta, CA (US) 93117

( * ) Notice: Subject to any disclaimer, the term of this patent is extended or adjusted under 35 U.S.C. 154(b) by 641 days.

(21) Appl. No.: 10/145,657

(22) Filed: May 14, 2002

(65) Prior Publication Data

US 2003/0205853 A1 Nov. 6, 2003

Related U.S. Application Data

(62) Division of application No. 09/432,920, filed on Nov. 2, 1999, now Pat. No. 6,541,539.

(60) Provisional application No. 60/106,982, filed on Nov. 4, 1998.

(51) Int. Cl.
B29C 65/00 (2006.01)
B29C 33/40 (2006.01)

(52) U.S. Cl. .................. 264/44; 264/108; 264/219; 264/234; 264/261; 264/621

(58) Field of Classification Search ............... 264/44, 264/621, 108, 219, 234, 261
See application file for complete search history.

(56) References Cited

U.S. PATENT DOCUMENTS

| 4,112,032 A | * | 9/1978 | Blaszyk et al. ............... 264/42 |
| 5,571,848 A | * | 11/1996 | Mortensen et al. ........... 521/61 |
| 6,160,190 A | * | 12/2000 | Harmer et al. .............. 585/458 |

OTHER PUBLICATIONS

I.A. Aksay, M. Trau, S. Manne, I. Honma, N. Yao, L. Zhou, P. Fenter, P.M. Eisenberger, S.M. Gruner—*Biomimetic Pathways for Assembling Inorganic Thin Films*—Science. vol. 27, pp. 892-897, Aug. 16, 1996.

Xianhui Bu, Pingyun Feng, Galen D. Stucky—*Large-Cage Zeolite Structures with Multidimensional 12-Ring Channels*—Science. vol. 278, pp. 2080-2085, Dec. 19, 199.

C.T. Kresge, M.E. Leonowkz, W.J. Roth, J.C. Vartuli & J.S. Beck —*Ordered Mesoporous Molecular Sieves Synthesized by a Liquid-Crystal Template Mechanism*—Nature. vol. 359, pp. 710-712, Oct. 22, 1992.

Dongyuan Zhao, Jianglin Feng, Qisheng Huo, Nocholas Melosh, Glenn H. Fredrickson, Bradley F. Chmelka, Galen D. Stucky—*Triblock Copolymer Syntheses of Mesoporous Silica with Periodic 50 to 300 Angstrom Pores*—Science. vol. 279, pp. 548-552, Jan. 23, 1998.

(Continued)

Primary Examiner—Christopher A. Fiorilla
(74) Attorney, Agent, or Firm—Fulbright & Jaworski (57) ABSTRACT

A low-cost, efficient method of preparing hierarchically ordered structures by filling a minimold with a microsphere-containing latex suspension, forming an close-packed array of microspheres within the minimold and filling void space in the array with a self-assembling mixture of hydrolyzed inorganic species and amphiphilic block copolymers. A macroporous and mesoporous material can be produced by subsequent thermal removal of the microspheres and copolymers.

15 Claims, 11 Drawing Sheets

OTHER PUBLICATIONS

Peidong Yang, Tao Deng, Dongyuan Zhao, Pingyun Feng, David Pine, Bradley F. Chmelka, George M. Whitesides, Galen D. Stucky—*Hierarchically Ordered Oxides*—Science. vol. 282, pp. 2244-2246, Dec. 18, 1998.

Peidong Yang, Dongyuan Zhao, David I. Margolese, Bradley F. Chmelka & Galen D. Stucky—*Generalized Syntheses of Large-Pore Mesoporous Metal Oxides With Semicrystalline Frameworks*—Nature. vol. 396, pp. 152-155, Nov. 12, 1998.

A. Firouzi, D.J. Schaefer, S.H. Tolbert, G.D. Stucky & B.F. Chmelka—*Magnetic-Field-Induced Orientational Ordering of Alkaline Lyotropic Silicate—Surfactant Liquid Crystals*—American Chemical Society, Soc.119, pp. 9466-9477, 1997.

Sarah H. Tolbert, Ali Firouzi, Galen D. Stucky, Bradley F. Chmelka—*Magnetic Field Alignment of Ordered Silicate-Surfacant Composites and Mesoporous Silica*—Science, vol. 278, pp. 264-268, Oct. 10, 1997.

O.D. Velev, T.A. Jede, R.F. Lobo, A.M. Lenhoff—*Porous Silica Via Colloidal Crystallization*—Nature. vol. 389, pp. 447-448, Oct. 2, 1997.

Markus Antonietti, Beate Berton, Christine Goltner, Hans-Peter Hentze—*Synthesis of Mesoporous Silica With Large Pores and Bimodal Pore Size Distribution by Templating of Polymer Latices*—Adv. Mater. 10, No. 2, pp. 154-158, 1998.

Brian T. Holland, Christopher F. Blanford, Andreas Stein—*Synthesis of Macroporous Minerals with Highly Ordered Three-Dimensional Arrays of Spheroidal Voids*—Science. vol. 281, pp. 538-540, Jul. 24, 1998.

Judith E.G. J. Wijnhoven & Willem L. Vos—*Preparation of Photonic Crystals Made of Air Spheres in Titania*—Science. vol. 281, pp. 802-804, Aug. 7, 1998.

Younan Xia & George M. Whitesides—*Soft Lithography*—Angew. Chem. Int. Ed. 37, 550-575, 1998.

Enoch Kim, Younan Xia, & George M. Whitesides—*Two-and-Three-Dimensional Crystallization of Polymeric Microspheres by Micromolding in Capillaries*—Adv. Mater. 8, No. 3, pp 245-247, 1996.

Christian Marzolin, Stephen P. Smith, Mara Prentiss & George Whitesides—*Fabrication of Glass Microstructures by Micro-Molding of Sol-Gel Precursors*—Adv. Mater. 10, No. 8, pp. 571-577, 1998.

Hong Yang, Neil Coombs, & Geoffrey A. Ozin—*Mesoporous Silica with Micrometer-Scale Designs*—Adv. Mater. 9, No. 10, pp. 811-814, 1997.

M. Trau, N. Yao, E. Kim, Y. Xias, G.M. Whitesides & I.A. Aksay—*Microscopic Patterning of Orientated Mesoscopic Silica through Guided Growth*—Nature. vol. 390 pp. 674-676, Dec. 25, 1997.

Gisheng Huo, David I. Margolese, Ulrlke Clesia, Pingyun Feng, Thurman E. Gler, Peter Sieger, Rosa Leon, Pierre M. Petroff, Ferdl Schuth & Galen D. Stucky—*Generalized Synthesis of Periodic Surfactant/Inorganic Composite Materials*—Nature. vol. 368, pp. 317-321, Mar. 24, 1994.

Dongyuan Zhao, Peidong Yang, Nick Melosh, Jianglin Fend, Bradley F. Chmelka and Galen D. Stucky—*Continuous Mesoporous Silica Films with Highly Ordered large Pore Stuctures*—.

S.L. Keller, P. Boltenhagen, D.J. Pine, and J.A. Zasadzinski—*Direct Observation of Shear-Induced Structures in Wormlike Micellar Solutions by Freeze-Fracture Electron Microscopy*—The American Physical Society, vol. 80, No. 12, pp. 2725-2728, Mar. 23, 1998.

Qisheng, Huo, Dongyuan Zhao, Jianglin Feng, Kenneth Weston, Steven K. Buratto, Galen D. Stucky, Stefan Schact, and Ferdi Schuth—*Room Temperature Growth of Mesoporous Silica Fibers: A New High-Surface-Area Optical Waveguide*—Advanced Materials vol. 9, No. 12, pp. 974-977, 1997.

M.E. Gimon-Kinsel and K.J Balkus, Jr.—*Mesoporous Molecular Sieve Thin Films*—Elseview Science B.V. 1998.

Alfons van Blaaderen, Rene Ruel & Pierre Wiltzius—*Template-directed Colloidal Crystallization*—Nature. vol. 383, pp. 321-323, Jan. 23, 1997.

* cited by examiner

METHOD OF FORMING MESOSCOPICALLY STRUCTURED MATERIAL

CROSS-REFERENCE WITH RELATED APPLICATIONS

This application is a divisional of U.S. patent application Ser. No. 09/432,920, filed Nov. 2, 1999, now U.S. Pat. No. 6,541,539, the entire contents of which are hereby incorporated by reference.

This application claims the benefit of U.S. Provisional Application No. 60/106,982, filed Nov. 4, 1998.

STATEMENT REGARDING FEDERALLY SPONSORED RESEARCH OR DEVELOPMENT

This invention was made with Government support under Grants No. DMR-9520971 (GDS), DMR-9257064 (BFC), and DMR-9632716, awarded by the National Science Foundation and Grant No. DAAH-04-96-1-0443 from the U.S. Army Research Office. The Government has certain rights in this invention.

BACKGROUND OF THE INVENTION

1. Field of the Invention

The invention relates to a method for synthesis of hierarchically ordered materials at multiple length scales using polyalkylene oxide triblock copolymers.

2. Description of Related Art

Nature abounds in hierarchical structures that are formed through highly coupled and often concurrent synthesis and assembly process over both molecular and long-range length scales. [Aksay, et al., Science, Vol. 273, 892 (1996)]. The existence of these hierarchical structures, such as abalones and diatoms, has both biological and evolutionary significance. The special architecture of the natural structures make them simultaneously hard, strong, and tough. It has thus been a long-sought goal to mimic the natural process responsible for these exquisite architectures using biomimetic strategies to control the structural organization and thereby produce useful materials with similar architecture.

Several approaches are currently available for the preparation of ordered structures at different length scales. For example, organic molecular templates can be used to form zeolitic structures with ordering lengths less than 3 nm [Bu, P., et al., Science, Vol. 278, 2080 (1997)]. Mesoporous materials with ordering lengths of 3–30 nm can be obtained using surfactants or amphiphilic block copolymers as the structure-directing agents [C. T. Kresge, et al., Nature, Vol. 359, 710 (1992); D. Zhao, et al., Science, Vol. 279, 548 (1998); P. Yang, et al., Nature, Vol. 399, 48 (1998); A. Firouzi, et al., J. Am. Chem. Soc. Vol. 119, 9466 (1997); and S. H. Tolbert, et al., Science, Vol. 278, 264 (1997)].

Studies have shown the use of latex spheres affords macroporous materials with ordering lengths of 100 n–1 $\mu$m [O. D. Velev, et al., Nature, Vol. 389, 447 (1997); M. Antonietti, et al., Adv. Mater., Vol. 10, 154 (1998); B. T. Holland, et al., Science, Vol. 281, 538 (1998); and J. E. G. J. Wijnhoven, et al., Science, Vol. 281, 802 (1998)]. Soft lithography has also been shown to make high-quality patterns and structures with lateral dimensions of about 30 nm to 500 $\mu$m. [Y. Xia, et al., Angew. Chem. Int. Ed., Vol. 37, 550 (1998); E. Kim, et al., Adv. Mater. Vol. 8, 245 (1996); and C. Marzolin, et al., Adv. Mater. Vol. 10, 571 (1998)].

Previous studies have shown use of micromolding to form patterned mesoporous materials [H. Yang, et al., Adv. Mater., Vol. 9, 811 (1997); and M. Trau, et al., Nature, Vol. 390, 674(1997)]. These studies, however, used acidic aqueous conditions to carry out the cooperative self-assembly, which is disadvantageous because of the poor processibility of the aqueous solutions. [Q. Huo, et al., Nature, Vol. 368, 317 (1994)]. The results of these studies were that either non-continuous films were formed or an electric field was needed to guide the mesophase growth, which required a non-conducting substrate [H. Yang, et al., supra; and M. Trau, et al., (1997), supra]. Studies have also shown the use of latex spheres to make disordered macro- and mesoporous silica [M. Antonietti, et al., supra].

Although previous studies addressed the synthesis of disordered mesoporous silica and alumina, using nonionic surfactants as the structure-directing agents and alkoxides as the inorganic sources, under aqueous media, the studies did not address large-pore mesoporous materials with vastly different composition, and nanocrystalline frameworks [Sayari, A., Chem. Mater. Vol. 8,1840 (1996)].

Despite all of earlier efforts in nanostructuring materials, the fabrication of hierarchically ordered structures at multiple length scales has remained an experimental challenge. Such materials are important both for systematic fundamental study of structure-property relationships and for their technological promise in applications such as catalysis, selective separations, sensor arrays, waveguides, miniaturized electronic and magnetic devices, and photonic crystals with tunable band gaps [D. Zhao, et al., Adv. Mater. Vol. 10, 1380 (1998) and M. E. Gimon-Kinsel, et al., Stud. Surf. Sci. Cata., Vol. 117, 111 (1998)].

Many applications for macro- and mesoporous metal oxides require structural ordering at multiple length scales. Thus, there exists a need for hierarchically ordered materials and a method for forming the materials which overcome or minimize the above mentioned problems and which have enormous potential for a variety of immediate and future industrial applications. A need also exists for forming the hierarchically ordered materials using low-cost, non-toxic, and biodegradable polyalkylene oxide block copolymers.

BRIEF SUMMARY OF THE INVENTION

The present invention overcomes drawbacks of the foregoing methods to prepare mesoporous materials and mesoscopic structures having orders at multiple length scales, and provides heretofore unattainable materials having very desirable and widely useful properties. These materials are prepared by combining amphiphilic block copolymer with an inorganic metal compound, preferably by creating a sol-gel solution. The amphiphilic block copolymer species acts as a structure-directing agent for the inorganic metal compound in self-assembling systems. Pressure is applied to the combination, thus the block copolymer and inorganic metal compound are self-assembled and polymerized into a mesoscopically structured material.

In another embodiment of this invention, the combination, preferably a sol, is placed on a substrate and a mold is placed on top of the sol and the substrate. An effective amount of pressure is applied to the mold and substrate, the amount of pressure is preferably between about $1 \times 10^5$ to $2 \times 10^5$ Pa, whereby the sol-gel solution is compressed between the substrate and the mold. The mold is left in place, undisturbed, for at least about 12 hours to allow increased cross-linking and consolidation of the inorganic oxide network, thus the block copolymer and inorganic metal compound are self-assembled and polymerized into a mesoscopically structured material. The mold is then removed and the resulting patterned material is calcined to yield the patterned mesoscopically ordered porous material having a multiple length scale. Calcination occurs at 300° C. to 600° C., preferably at about 400° C.–450° C. Unlike previous mesoscopically ordered materials, the materials described in this invention can be produced with multiple length scales on the order of approximately 10 nm and 100 nm.

In accordance with a further embodiment of the invention mesoporous materials and mesoscopic structures having orders at multiple length scales are synthesized. Synthesis is carried out by contacting a mold, which ends have been cut, with a substrate. A mold is filled with a latex colloidal suspension, whereby an array is formed within the mold. An amphiphilic block copolymer is then combined with an inorganic metal compound, preferably by creating a sol, and the mold is filled with the sol whereby the block copolymer and inorganic metal compound are self-assembled and polymerized into a mesoscopically structured material exhibiting multiple structural ordering length scales on the order of approximately 10, 100, and 1000 nm.

These and other features, aspects, and advantages of the present invention will become better understood with regard to the following detailed description, appended claims, and accompanying drawings.

BRIEF DESCRIPTION OF THE DRAWINGS

FIG. 1a is a schematic diagram for patterning of mesoporous solids, a droplet of sol-gel/block copolymer precursor solution was compressed between the silicone mold and the substrate by applying pressure; FIG. 1b is a schematic diagram of a sequential process for producing hierarchical ordering over three discrete and independent length scales.

FIG. 2d shows a hexagonally ordered mesoporous niobia prepared using Pluronic P-123 block copolymer.

FIGS. 4b and 4d show a diamond lattice of the macroporous framework skeleton.

DETAILED DESCRIPTION OF THE INVENTION

The present application is directed to an efficient preparation of hierarchically ordered structures with three-dimensional structures ordered over multiple length scales. The ordered structures are prepared by combining concurrently or sequentially the techniques of micromolding, latex templating, and cooperative self-assembly of hydrolyzed inorganic species and amphiphilic block copolymers. The resulting materials show hierarchical ordering over several discrete and tunable length scales ranging from about 10 nm to several micrometers. The respective ordering structures can be independently modified by choosing different mold patterns, latex spheres and block copolymers.

The inorganic species includes: metal alkoxides; metal chlorides; metal oxides; such as $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, $Al_2TiO_5$, and sulfides. The metal alkoxides, metal halides, and metal oxides can be transition metal alkoxides, transition metal chlorides, and transition metal oxides. The "transition metal", as used herein, is an element designated in the Periodic Table as belonging to Group IIIB (e.g., scandium and yttrium), Group IVB (eg., titanium, zirconium and hafnium), Group VB (e.g. chromium, molybdenum and tungsten), Group VIIB (e.g., manganese, technitium and rhenium), Group VIIIB (iron, ruthenium, osmium, cobalt, rhodium, iridium, nickel, palladium and platinum), Group IB (e.g., copper, gold and silver) and Group IIB (zinc, cadmium and mercury).

Commercially available, low-cost, non-toxic, and biodegradable amphiphilic poly(alkylene oxide) block polymers can be used as the structure-directing agents in non-aqueous solutions for organizing the network forming metal compound species. Preferably the block copolymer is a triblock copolymer in which a hydrophilic poly(alkylene oxide) such as polyethylene oxide $(EO_x)$ is linearly covalent with the opposite ends of a hydrophobic poly(alkylene oxide) such as poly(propylene oxide) $(PO_y)$ or a diblock polymer in which, for example, poly(ethylene oxide) is linearly covalent with poly(butylene oxide) $(BO_y)$. This can variously be designated as follows:

poly(ethylene oxide)-poly(propylene oxide)-poly(ethylene oxide)

$HO(CH_2CH_2O)_x(CH_2CH(CH_3)O)_y(CH_2CH_2O)_xH$ $EO_xPO_yEO_x$ or poly(ethylene oxide)-poly(butylene oxide)-poly(ethylene oxide)

$HO(CH_2CH_2O)_x(CH_2CH(CH_3CH_2)O)_yH$

PEO-PBO-PEO
$EO_xBO_yEO_x$ where x is 5 or greater and y is 30 or greater, with no theoretical upper limit to either value subject to practical considerations. Amphiphilic block copolymers with different architectures, molecular weight or concentrations have been used to obtain the third ordering structure that can be either hexagonal or cubic with ordering length between about 5 nm to 20 nm.

The synthesis of the precursor solution was outlined in D. Zhao, et al., Science, Vol. 279, 548 (1998) and Zhao, et al., Adv. Mater, Vol. 10, 1380 (1998). Tetraethoxysilane (TEOS), tetramethoxysilane (TMOS), and tetrapropoxysilane (TPOS) were suitable sources of silica for the preparation of mesoporous silica structures. Hexagonal mesoporous silica structures were formed in acid media (pH<1) with HCl, HBr, HI, $HNO_3$, $H_2SO_4$, or $H_3PO_4$ acids. In Zhao, et al., Adv. Mater, Vol. 10, oligomeric silica sol-gel was obtained by pre-hydrolyzing of TEOS in ethanol by an acid catalyzed. The oligomeric silica sol-gel was then added into a mixture solution of poly(ethylene oxide)-poly(propylene oxide)-poly(ethylene oxide) PEO-PPO-PEO triblock copolymers or alkyl poly(ethylene oxide) and inorganic metal precursor compound in water and ethanol. The final composition of this mixture was (in molar ratio) 0.0068–0.034 $EO_{20}PO_{70}EO_{20}$ triblock copolymer: 0.51 to about 3.0 inorganic metal compound: 1 tetraethylorthoxysilicane (TEOS): 11–50 ethanol (EtOH): 0.002–0.04 HCl: 18–65 $H_2O$.

In a typical synthesis, 2.08 g TEOS were added to 5 g ethanol, 0.4 g water and 0.4 g (0.1 M) of HCl solution with stirring at room temperature for 0.5 hours, then heated at 70° C. without stirring for 1 hours. After cooling to room temperature, 1 g $EO_{20}PO_{70}EO_{20}$ (average molecular weight 5800), 1 g NaCl, 10 g ethanol and 10 g water were added to this solution with stirring at room temperature for 1 hour. The samples are then calcined at about 400° C. to 450° C. for about 5 hours to remove the block copolymer. For the Al and SiAl metal oxides, calcination is carried out at 600° C. for 4 hours. For $WO_3$, calcination at 3000° C. is sufficient to yield ordered mesoporous oxides.

Table 1 summarizes the synthetic conditions, including the inorganic precursors and aging temperatures and times for the mesostructured inorganic/copolymer composites (before calcination) using $EO_{20}PO_{70}EO_{20}$ as the structure-directing agent. The ordering lengths shown in Table 1 correspond to the largest d value observed from low-angle XRD patterns; it ranged from about 70 to 160 Å for the different systems.

In practicing this invention, one can use a commercially available latex colloidal suspension containing latex spheres to template the second level ordering structure. A latex suspension containing polymer, preferably polystyrene, microspheres with sizes ranging from about 50 nm to 1500 nm is preferred. The latex spheres are also preferably uniform in size. The latex suspension used in the following examples was obtained from Bangs Laboratory, Fishers, Ind.

The substrate used in the following examples was a freshly cleaned silicon wafer, however, other substrates such as glass, quartz, and polymers may be substituted for the silicon wafer. Besides ethanol, other organic solvents, such as methanol, 1,4-dioxane, tetrahydrofuran (THF), $CH_3CN$, and propanol, can be used as solvents. The mold used in the following examples was a poly(dimethylsiloxane) (PDMS) mold. The procedure for making the mold is outlined in Y. Xia, et al., Angew. Chem. Int. Ed. 37, 550 (1998). The patterned structures of the resulting materials can have a thickness of a submicron to several tens micrometers depending on the relief depth of the micromold used. One skilled in the art may practice the invention using any mold having micro features.

Mesoscopic ordering in the synthesized materials was characterized by their low-angle X-ray diffraction patterns and transmission electron microscope (TEM) images. All TEM images were recorded on a JEOL 2010 transmission electron microscope operated at 200 KeV. The scanning electron microscope (SEM) images were taken on a JEOL F6300 scanning electron microscope operated at 3 KeV.

Figure 4A:
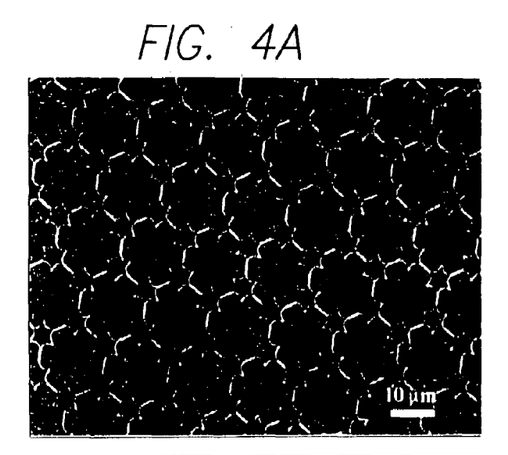
FIGS. 4a–4d are SEM images, at different magnifications, of hierarchically ordered mesoporous silica possessing organization over three discrete characteristic dimensions, prepared using the scheme of FIG. 1b.
Figure 4B:
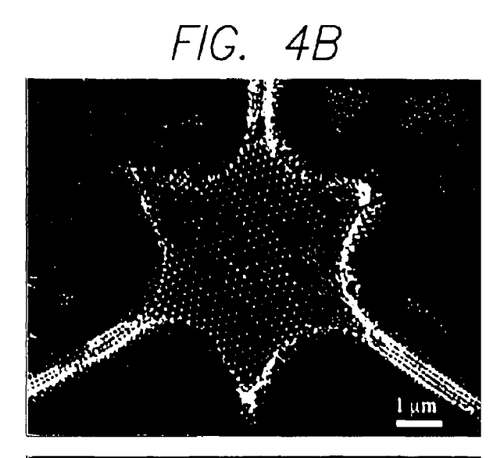
Figure 4C:
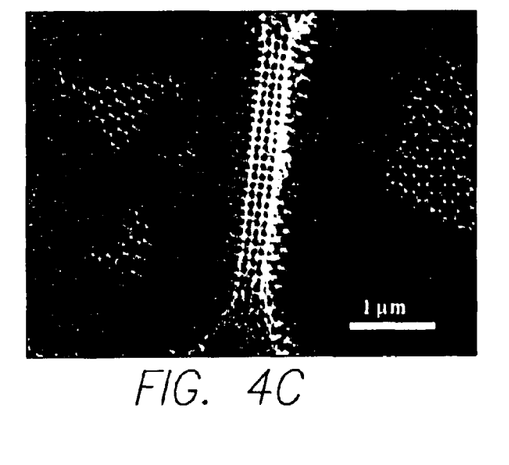
Figure 4D:
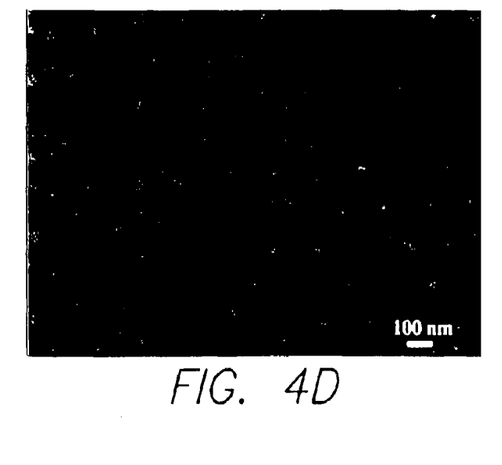
Figure 4E:
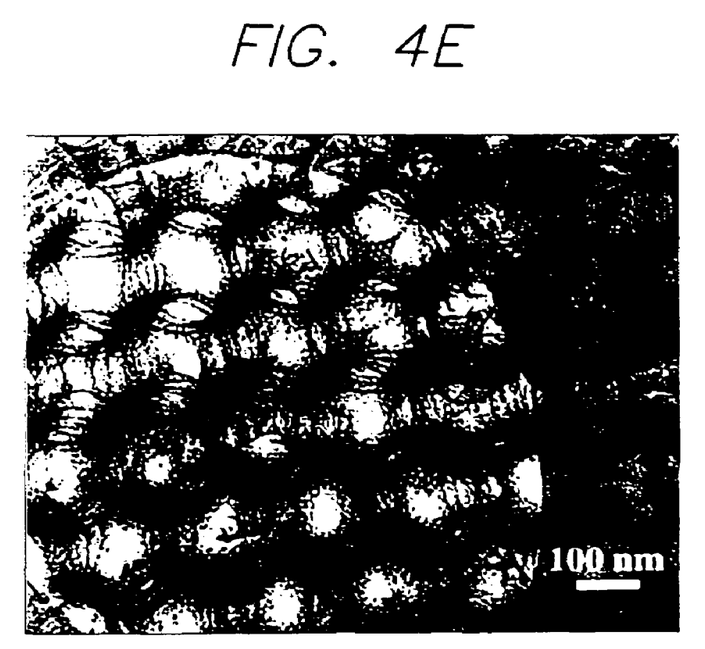
FIGS. 4e and 4f are transmission electron microscope (TEM) images of FIGS. 4a–4d, showing that the framework of the macroporous skeleton is made up of ordered cubic mesoporous silica with an ordering length of approximately 11 nm; this sample was synthesized using Pluronic F-127 block copolymer as the structure-directing agent.
Figure 4F:
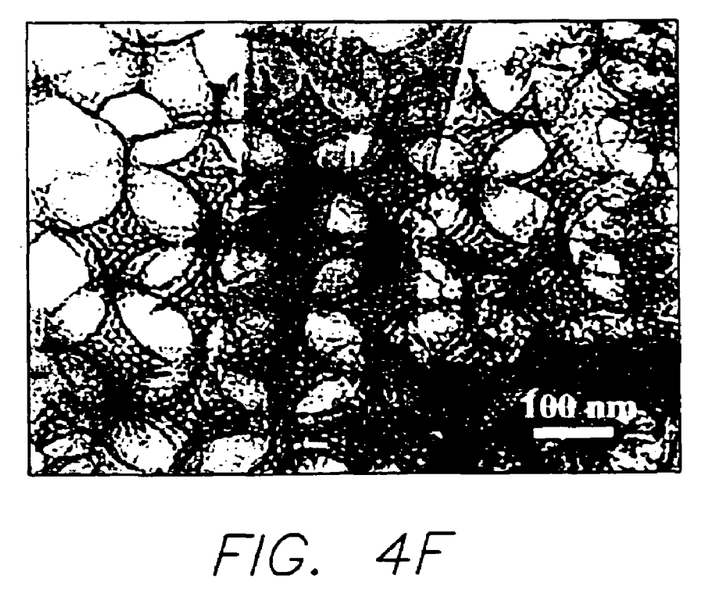

During latex templating, it is believed that the organization of latex spheres in confined geometries involves nucleation due to capillary attractive forces between the microspheres and growth due to evaporation and influx of suspension to compensate for the loss of solvent. [See, E. Kim, et al., Adv. Mater. Vol. 8, 245 (1996)]. The different packing sequences observed in the larger triangular and the smaller bridge areas are presumably the consequence of the different edge effects during the colloidal organization. [See, A. van Blaaderen, et al., Nature, Vol. 385, 321 (1997)]. In addition, the inorganic oxide, e.g., silica, framework of the macroporous structure is itself made up of mesoscopically ordered cubic arrays of cages with characteristic dimension of approximately 11 nm as established by the Pluronic F-127 block copolymer. FIGS. 4e and 4f show typical TEM images recorded for the same hierarchically ordered silica. The ordered macroporous structure (approximately 100 nm) can be seen in FIGS. 4a–4f, along with the silica framework consisting of ordered cubic arrays of mesopores (approximately 11 nm).

The formation of end-caps in self-assembled surfactant cylinders is not favored given their high free energy of formation. Thus, within the highly confined geometries of the PDMS micromold, the cylindrical block copolymer aggregates are expected to oriented preferentially parallel to the micromold walls in order to minimize the number of aggregate end-caps. These patterned lines of mesoporous silica can be potentially used as waveguides. In addition, combining these patterning capabilities and the high porosities achievable, greater than 70%, for such mesoporous silica is extremely promising for low-dielectric material applications related to the miniaturization of electronic circuits and devices.

Many applications of macro- and mesoporous metal oxides require structural ordering at multiple length scales. Development of such strategies for hierarchically ordered materials using low-cost, non-toxic, and biodegradable polyalkylene oxide block copolymers has enormous potential for a variety of immediate and future industrial applications. A continuing challenge for materials chemists and engineers is the ability to create multifunctional composite structures with well-defined superimposed structural order from nanometer to micrometer length scales Many uses have been proposed for patterned Macro- and mesoporous metal oxide materials, particularly in the fields of catalysis, molecular separations, fuel cells, adsorbents, optoelectronic devices, and chemical and biological sensors. For example, the patterned lines that were demonstrated for mesoporous silica and other metal oxides can be potentially used as waveguides. In addition, the combination of the patterning capabilities and the high porosities achievable for such mesoporous materials is extremely promising for dielectric material applications related to the miniaturization of electronic circuits and devices. [D. Zhao, et al., Adv. Mater., Vol. 10, 1380 (1998)]. Macro- and mesoporous $Nb_2O_5$ can be potentially used as an ultra-sensitive humidity sensor. [M. E. Gimon-Kinsel, et al., Stud. Surf. Sci. Cata., Vol. 117, 111 (1998)].

The resulting materials showed hierarchical ordering over several discrete and tunable length scales ranging from 10 nm to several micrometers. The respective ordering structures can be independently modified by choosing different mold patterns, latex spheres and block copolymers. The versatility of this invention is exemplified by the syntheses of patterned macro- and mesoporous materials of various compositions, such as silica, niobia, and titania, which have various physical properties including semiconducting, low dielectric-constant, and high dielectric constants.

The hierarchical ordering process can be further extended to the preparation of other patterned mesoporous metal oxides, such as $TiO_2$ using sol-gel mesophase self-assembly chemistry developed in our laboratory. Particularly interesting for hierarchically ordered $TiO_2$ is the possibility of fabricating photonic crystals with tunable photonic band gap in the visible and infrared region. Other possible applications include optical filter and antenna. There is also tremendous interest in using mesoporous $ZrO_2$, $AlSiO_{3.5}$, $AlSiO_{5.5}$, and $SiTiO_4$ as acidic catalysts. Mesoporous materials with semiconducting frameworks, such as $WO_3$ and $SnO_2$ can also be used in the construction of fuel cells.

Thus, such materials are important both for systematic fundamental study of structure-property relationships and for their technological promise in applications such as catalysis, selective separations, sensor arrays, waveguides, miniaturized electronic and magnetic devices, and photonic crystals with tunable band gaps.

EXAMPLE 1

Figures 1A, 1B:
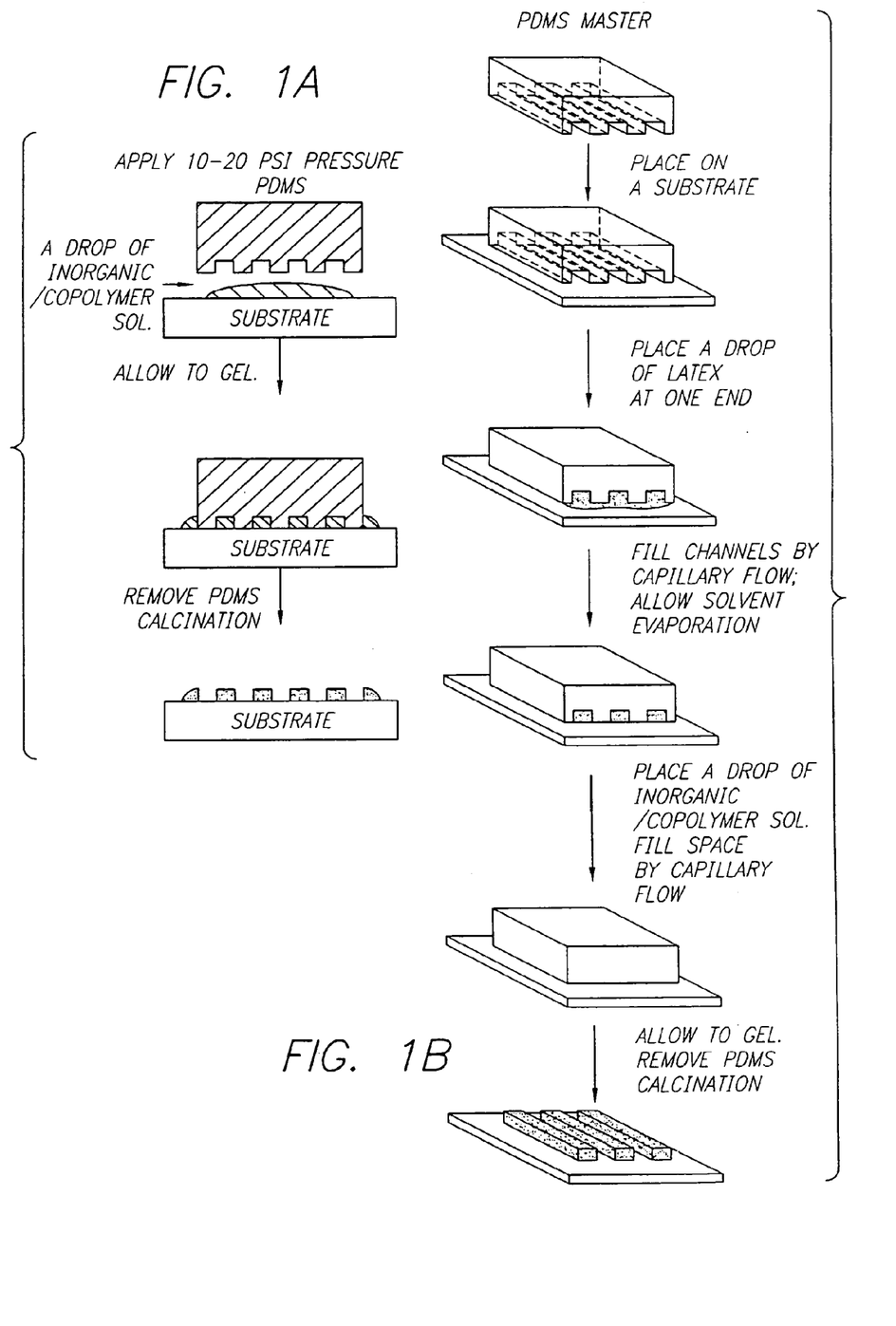
FIGS. 1a and 1b are schematic diagrams of the molding methods used to fabricate hierarchically ordered structures on a substrate.

FIG. 1a illustrates the procedure that was used to fabricate materials with two scale ordering. Here, the gelation of a self-assembling sol-gel precursor solution was carried out in the confined space of a poly(dimethylsiloxane) (PDMS) mold, the procedure for which is outlined in Y. Xia, et al., Angew. Chem. Int. Ed., Vol. 37, 550 (1998), incorporated herein by reference.

The precursor solution had the same composition as used in the preparation of mesoporous silica films outlined in D. Zhao, et al., Science, Vol. 279, 548(1998) and Zhao, et al., Adv. Mater, Vol. 10, 1380 (1998).

The sol-gel precursor solution of the present invention consisted of 0.008–0.018 poly(ethyleneoxide)-b-poly(propyleneoxide)-b-poly(ethyleneoxide) ($EO_nPO_mEO_n$) triblock copolymer: 1 tetraethylorthoxysilicane (TEOS): 20–60 ethanol (EtOH): 0.01–0.04 HCl: 5–10 $H_2O$. Pluronic P-123 ($EO_{20}PO_{70}EO_{20}$) was used as the triblock copolymer.

To mold these materials, a drop of the precursor solution was put on a freshly cleaned substrate (e.g. silicon wafer) after which the mold was placed face down to cover the drop on the surface of the substrate. A pressure of roughly $1 \times 10^5$ to $2 \times 10^5$ Pa was applied to the PDMS mold. The area of the patterned surface was typically 1–5 $cm^2$ with molded feature sizes in the micrometer size range. It is important that the liquid dewets the surface to permit contact between the PDMS elastomer and the substrate in regions where no mesostructured material is desired. This dewetting is driven by both the applied pressure and the difference between the interfacial tensions of the precursor and the PDMS mold. [See, C. Marzolin, et al., Adv. Mater. Vol. 10, 571 (1998)]. Gelation of the mesophase precursor solutions normally occurred within hours. The mold and the resulting mesostructure were left undisturbed for at least 12 h to allow increased cross-linking and consolidation of the inorganic oxide network. After removing the mold, the patterned material was calcined at 400° C. in air for 5 h to remove the amphiphilic block copolymer species and thereby produce patterned mesoscopically ordered porous solids.

RESULTS OF EXAMPLE 1

Figure 2A:
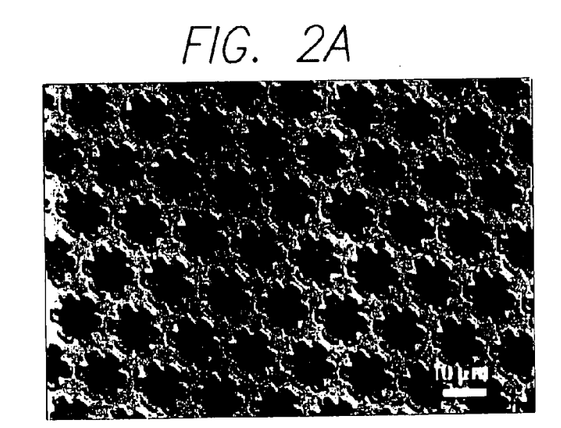
FIGS. 2a–2d are scanning electron microscope (SEM) images of different patterns of mesoporous silica (FIGS. 2a–2c) and niobia (FIG. 2d) formed using the scheme of FIG. 1a; materials shown in (FIGS. 2a and 2c) are made of hexagonally ordered mesoporous silica prepared using the amphiphilic block copolymer $EO_{20}PO_{70}EO_{20}$ (Pluronic P-123) as the structure directing agent; the material shown in FIG. 2b is made of cubic mesoporous silica prepared using the block copolymer $EO_{106}PO_{70}EO_{106}$ (Pluronic F-127)

Mesoscopic ordering in these materials is characterized by their low-angle X-ray diffraction patterns and transmission electron microscope (TEM) images. FIGS. 2a and 2c show several representative scanning electron microscope (SEM) images of the dual-scale synthesized ordered materials. The structural ordering observed at the micrometer level was imparted by the micromolding operation using the PDMS mold, while the mesoscopic ordering results from the self-assembly of the sol-gel block copolymer solution. Both isolated (FIG. 2a) and continuous (FIG. 2b) features can be produced by this overall process. The materials shown in FIGS. 2a and 2c are hexagonal mesoporous silica (cell parameter a=approximately 10.5 nm). The smallest line feature obtained with the micromolding was about 100 nm (FIG. 2c).

EXAMPLE 2

The procedure of Example 1 was followed, substituting Pluronic F-127 ($EO_{106}PO_{70}EO_{106}$) for Pluronic P-123 ($EO_{20}PO_{70}EO_{20}$) as the structure-directing triblock copolymer species.

RESULTS OF EXAMPLE 2

Figure 2B:
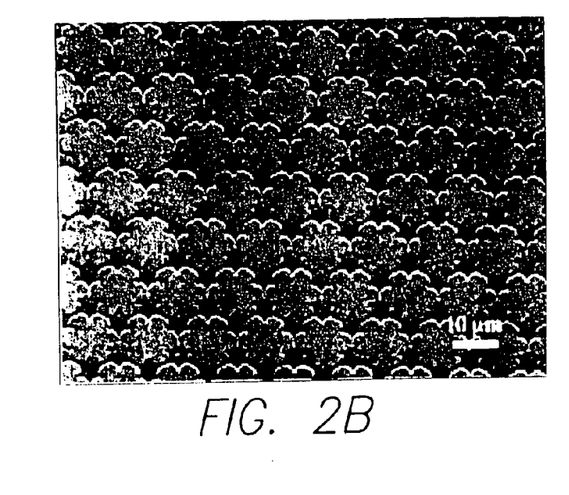
Figure 2C:
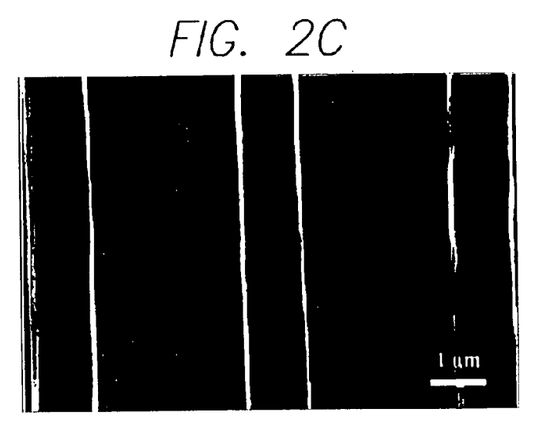

The results of using Pluronic F-127 ($EO_{106}PO_{70}EO_{106}$) as the triblock copolymer was the material synthesized was cubic mesoporous silica (cell parameter a=approximately 11 nm), as seen in FIG. 2b.

EXAMPLE 3

The procedure of Example 1 was followed by substituting $NbCl_5$ as the inorganic metal precursor compound. 1 g of Pluronic P-123 ($EO_{20}PO_{70}EO_{20}$) was dissolved in 10 g of ethanol. To this solution, 0.01 mole of $NbCl_5$ was added with vigorous stirring.

RESULTS OF EXAMPLE 3

Figure 2D:
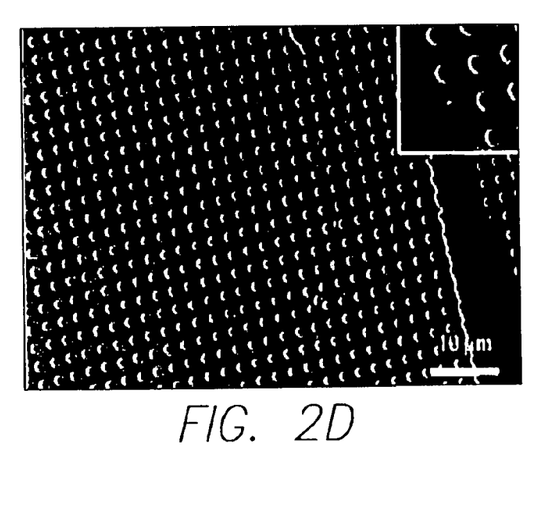

FIG. 2d shows a representative SEM image of a dual-scale synthesized ordered $Nb_2O_5$ material, which is a potential ultra-sensitive humidity sensor.

EXAMPLE 4

The procedure of Example 1 was followed by substituting $TiCl_4$ as the inorganic metal precursor compound. 1 g of Pluronic P-123 ($EO_{20}PO_{70}EO_{20}$) was dissolved in 10 g of ethanol. To this solution, 0.01 mole of $TiCl_4$ was added with vigorous stirring.

RESULTS OF EXAMPLE 4

Figure 3:
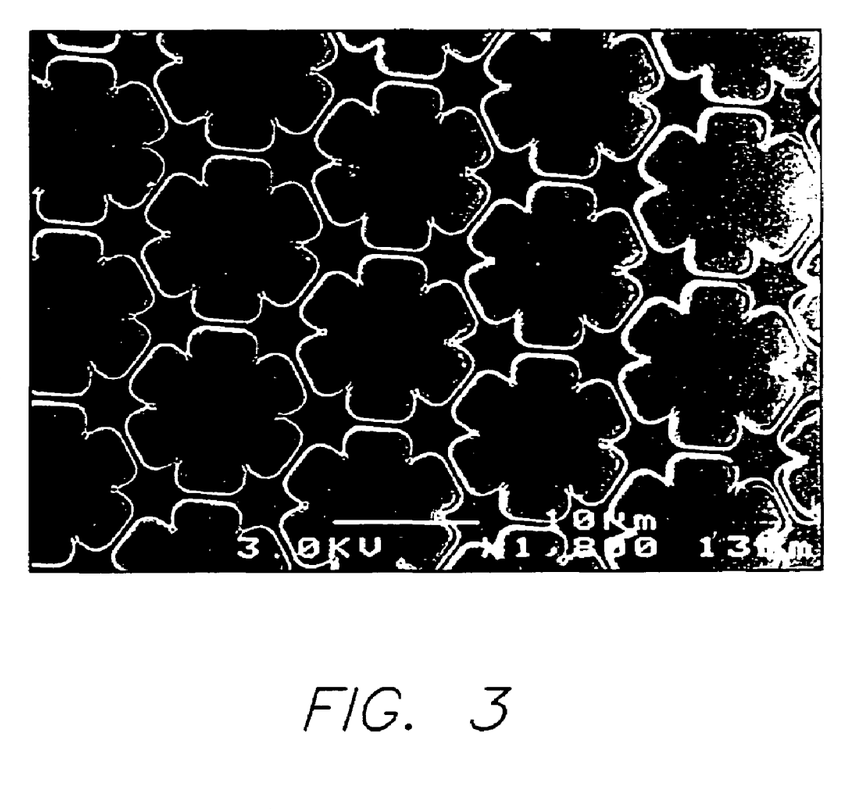
FIG. 3 is a SEM image of a typical structure of hierarchically ordered titania.

FIG. 3 shows a SEM image of a typical structure of hierarchically ordered titania.

EXAMPLE 5

To obtain materials with ordering on three discrete length scales, latex templating was combined sequentially or concurrently with micromolding and cooperative self-assembly. The sequential process is illustrated in FIG. 1b. Both ends of the PDMS mold were cut open to allow fluid to enter and air/solvent to escape. The mold was then placed on a freshly cleaned Si substrate. The compliant nature of the PDMS elastomer allowed conformal contact between the mold and the substrate, and a network of channels formed. A drop of a latex colloidal suspension containing polystyrene microspheres (200 nm diameter, 10 weight % in water) was placed at one cut end of the PDMS mold, so that the fluid suspension filled the network of the micromold channels by capillary action.

Upon evaporation of the solvent at room temperature, the latex spheres organized into a close-packed array within the confinement of the micromold channel network. A drop of sol-gel block copolymer precursor solution, containing the same composition as in Example 1, was subsequently placed at the same end of the mold and similarly imbibed into the latex-sphere filled micromold channels by capillary action. The PDMS mold and contents were then left undisturbed for at least 12 hours, during which time cross-linking and polymerization of the inorganic oxide precursor species occurred to yield a robust composite product. The mold was removed and the resulting materials were calcined at 450° C. in air for 2 hours to remove the block copolymer species and the polystyrene spheres.

RESULTS OF EXAMPLE 5

The synthesized materials exhibited hierarchical ordering with discrete characteristic length scales of 10, 100, and 1000 nm in a single body. FIGS. 4a–4d illustrate several typical SEM images for these ordered structures. The structural organization over the three independent length scales was achieved by combining block copolymer self-assembly, latex-sphere templating, and micromolding to produce ordered mesopores (10 nm), macropores (100 nm), and surface patterns (1000 nm). Micromolding resulted in high quality surface patterns with micron size dimensions (FIG. 4a); the patterned features themselves were made of the inorganic oxide solid organized to form highly ordered macropores that had been templated by close-packed arrays of the latex spheres (FIGS. 4b–4d). The high degree of macropore ordering (approximately 100 nm) was clearly observed both in the triangular features seen in FIG. 4b and within the bridges observed in FIG. 4c, although FIGS. 4b and 4c show different packing sequences.

EXAMPLE 6

In order to fabricate materials with three hierarchically ordering length scales into isolated patterned structures, the procedure of Example 1 was followed, with the addition of combining a latex sphere suspension with the sol-gel/triblock copolymer in a volume ration of 1:1. In this example, a drop of sol-gel/block copolymer and latex sphere suspension (volume ratio 1:1) was placed on the substrate before application of the PDMS mold.

RESULTS OF EXAMPLE 6

Figure 5A:
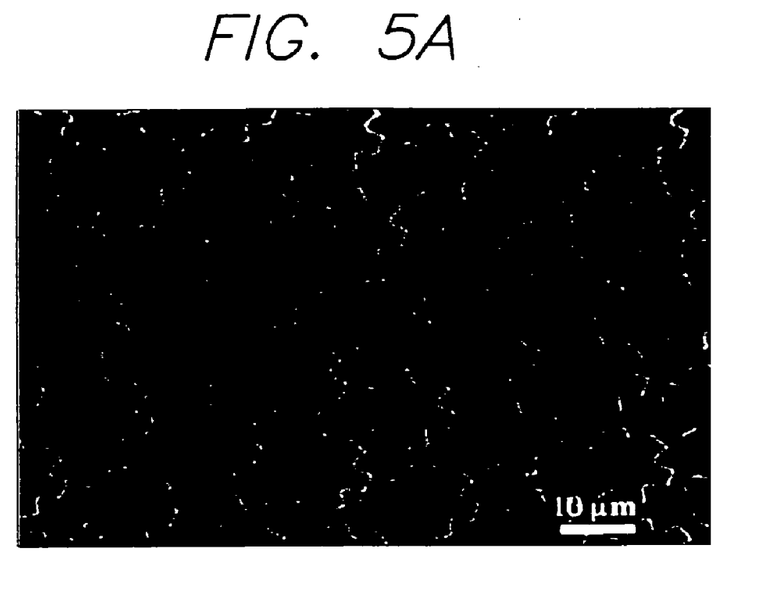
FIGS. 5a and 5b are SEM images of hierarchically ordered materials with three distinct order length scales, prepared using the scheme of FIG. 1a, with isolated pattern features.
Figure 5B:
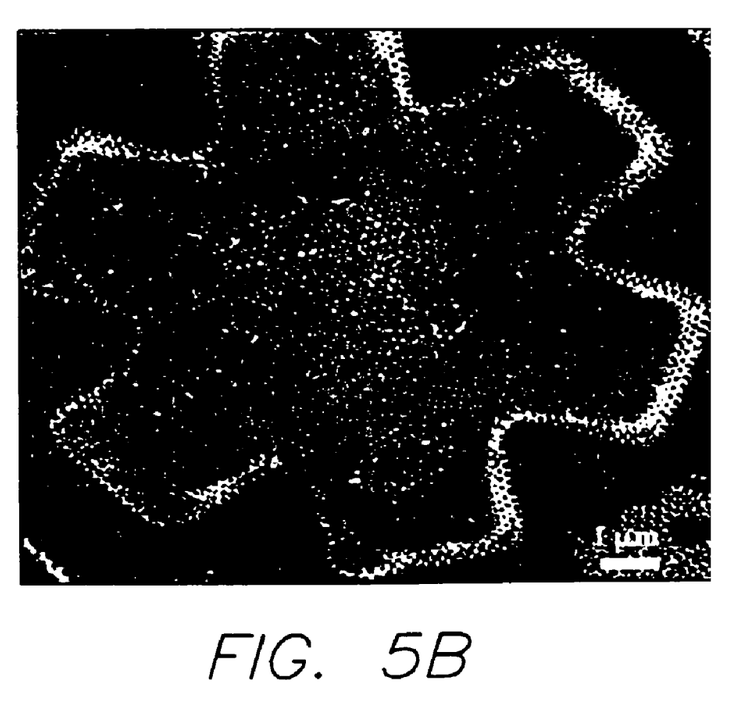
Figure 5C:
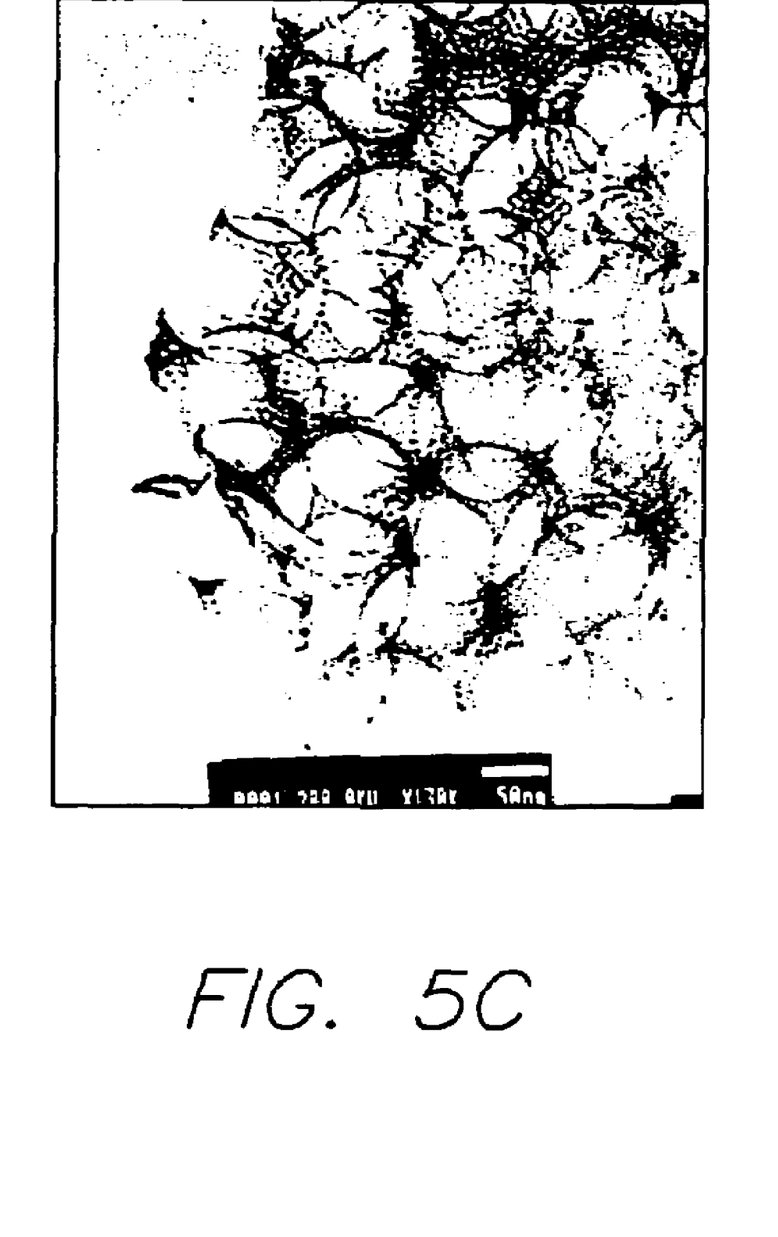
FIG. 5c is a TEM image of FIGS. 5a and 5b, confirming that the macroporous framework of the material is made up of cubic mesoporous silica similar to FIGS. 4a–4d.
Figure 6:
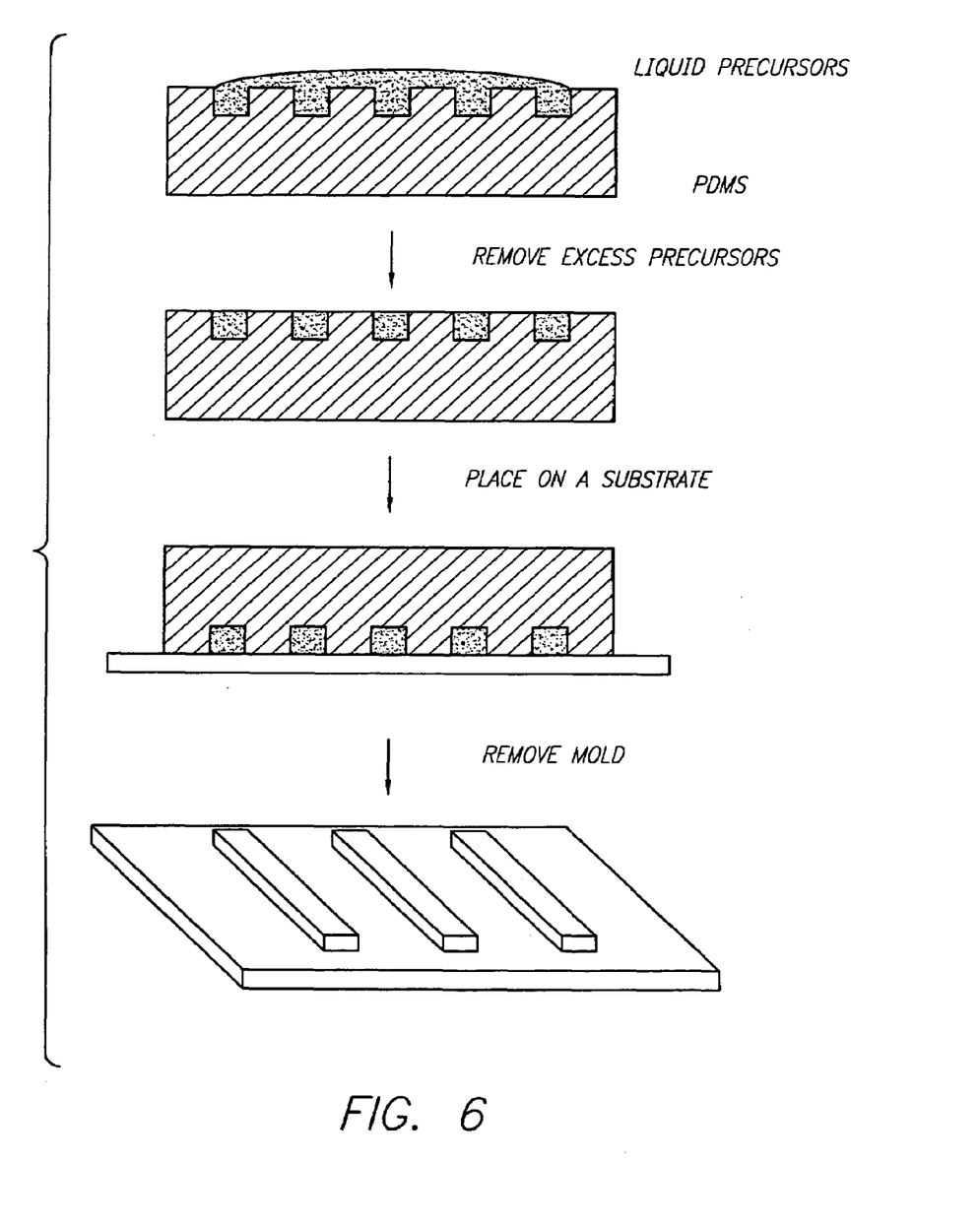
FIG. 6 is a schematic diagram of the microtransfer molding methods used to fabricate hierarchically ordered structures on a substrate.

FIGS. 5a and 5b show SEM images of such isolated surface pattern features with ordering lengths of both approximately 1000 and 100 nm, which resulted from micromolding and latex-sphere templating, respectively. The TEM image (FIG. 5c) and low angle X-ray diffraction patterns of these materials further confirmed that the inorganic oxide (silica) frameworks of the macropore structures consisted of highly ordered mesopore arrays.

EXAMPLE 7

The technique of microtransfer molding was used to prepare materials with two scale or three scale ordered porous material. In this microtransfer molding process a drop of liquid inorganic precursor solution was applied to the patterned surface of a PDMS mold and the excess liquid was removed by scraping with a flat PDMS block. The liquid precursor used was the inorganic/block copolymer solution. The filled mold was then placed in contact with a silicon wafer substrate. A pressure of about $1 \times 10^5$ to $2 \times 10^5$ Pa was then applied to the mold and the mold/substrate structure was left undisturbed for at least 12 hours, to ensure the proper cross-linking of the inorganic frameworks. The mold was peeled away carefully to leave a patterned structure on the surface of the substrate. This structure was then calcined at 450° C. to remove the block copolymer and the latex spheres.

RESULTS OF EXAMPLE 7

Figure 7:
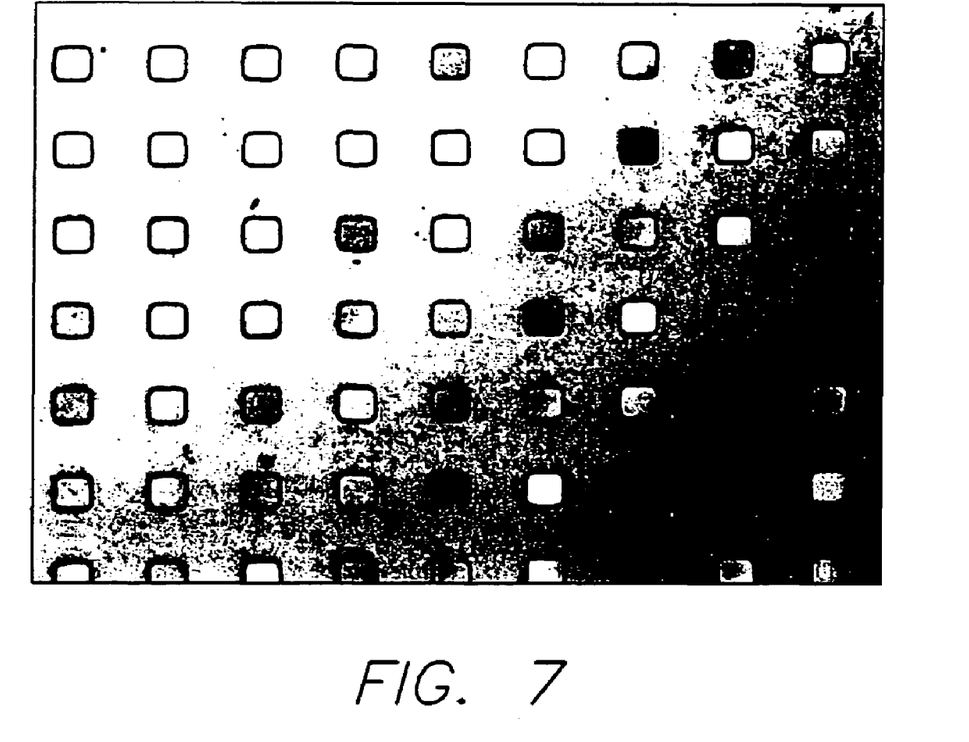
FIG. 7 is an optical microscope image of the microtransfer molding method used to prepare mesoporous silica; the inorganic/block copolymer solution was used as the liquid precursor solution.

FIG. 7 shows an optical microscope image of the mesoporous silica fabricated by microtransfer molding.

EXAMPLE 8

The procedure of Example 7 was followed, by substituting a mixture of latex suspension and inorganic/copolymer solution (in a volume ratio of 1:1) for the inorganic/block copolymer liquid precursor solution.

RESULTS OF EXAMPLE 8

Figure 8A:
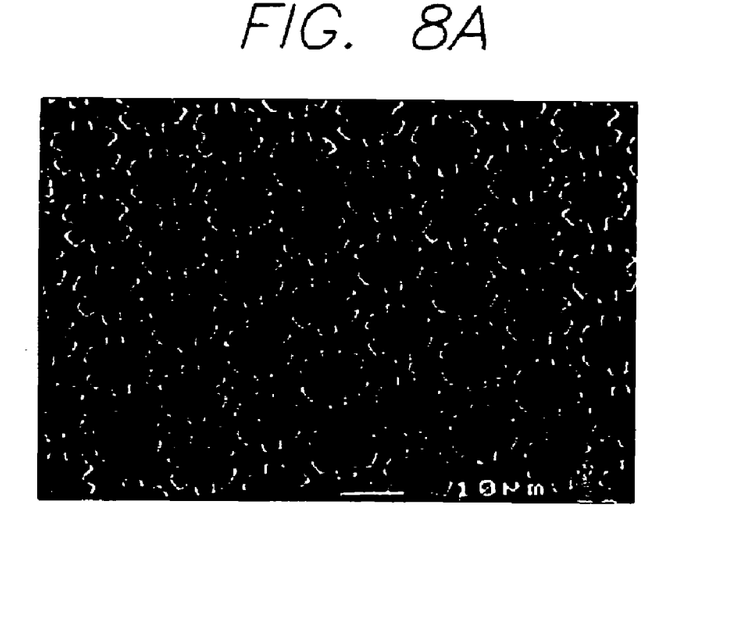
FIGS. 8a and 8b are SEM images of hierarchically ordered materials with three distinct order length scales prepared using the scheme of FIG. 6, with isolated pattern features.
Figure 8B:
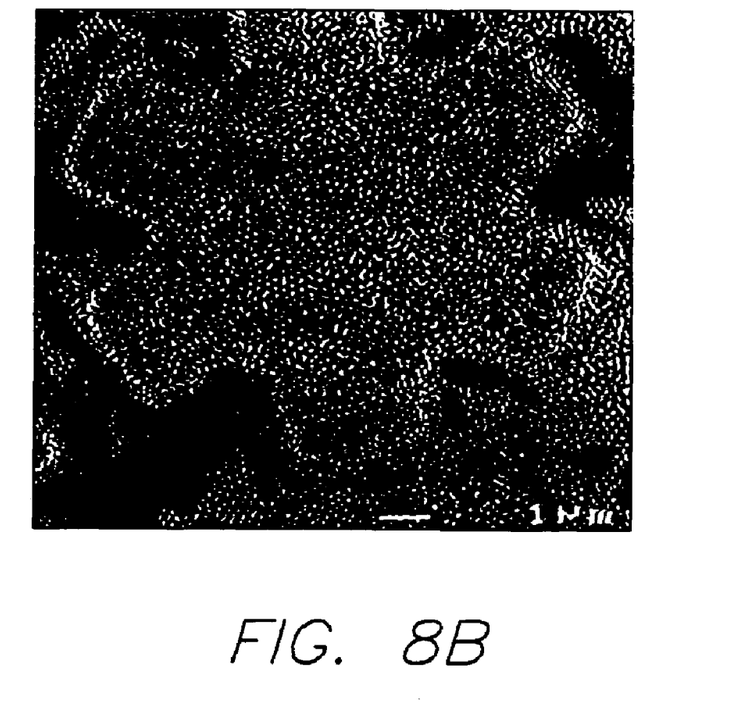
Figure 8C:
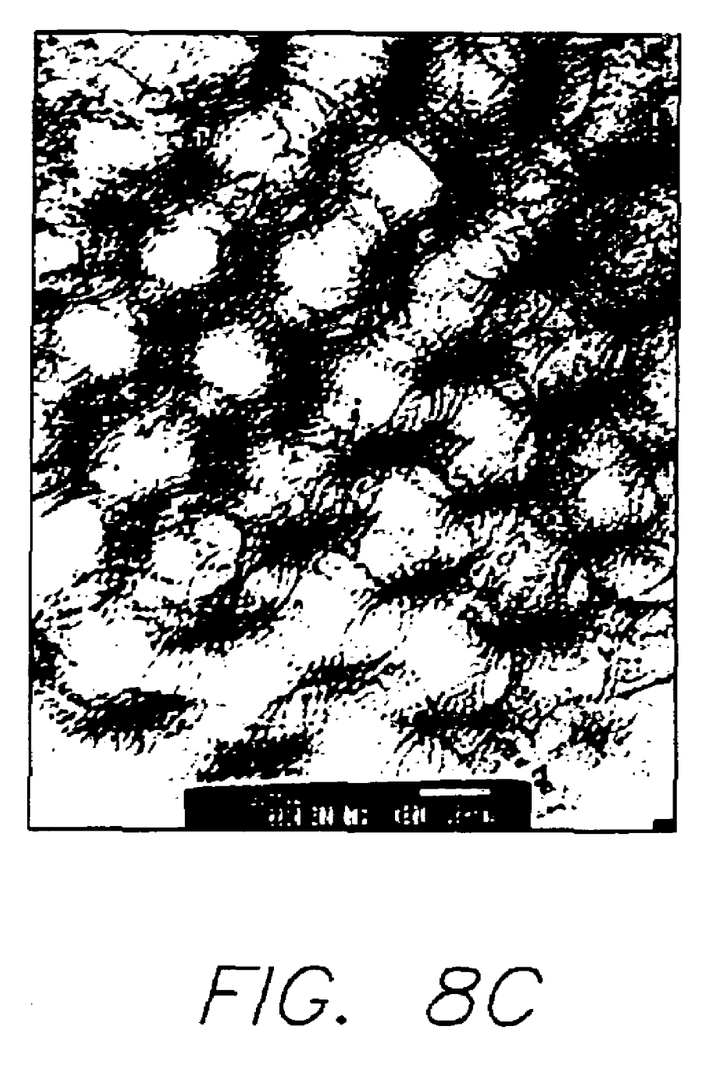
FIG. 8c is a TEM image of FIGS. 8a and 8b, confirming that the macroporous framework of the material is made up of cubic mesoporous silica similar to FIGS. 4a–4d.

FIGS. 8a and 8b show SEM images of typical structures of hierarchically ordered silica that were fabricated by microtransfer molding. FIG. 8c shows a TEM image of FIGS. 8a and 8b. The TEM image and low angle X-ray diffraction patterns of these materials further confirmed that the inorganic oxide frameworks of the macropore structures consisted of highly ordered mesopore arrays. This method was also capable of generating both isolated and interconnected microstructures. However, residual materials cannot usually be avoided between the patterned raised features.

EXAMPLE 9

The procedure of EXAMPLE 7 was followed by substituting the step of removing the excess liquid precursor solution by blowing off with a stream of nitrogen or air for the removal by scraping with a flat PDMS block.

EXAMPLES 10 TO 21

The procedure of Example 1 can be followed, by preparing a sol-gel solution as disclosed in P. Yang, et al., Science, Vol. 282, 2244 (1998), incorporated by reference herein, with diverse thermally stable mesostructured metal oxides, including $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, $Al_2TiO_5$, and sulfides. The metal oxides may be used in the sol-gel solution by slowing hydrolysis of inorganic chloride precursor species in alcohol solutions. Table 1 summarizes the synthetic conditions for the mesostructured inorganic/copolymer composites.

The syntheses of these hierarchically ordered materials demonstrate the ability to control the overall structure of the inorganic materials at several discrete and independent ordering length scales. It is the self-assembly of sol-gel inorganic/block copolymer mesophase around organized arrays of latex spheres in a patterned mold that leads to structures with such high complexities. The respective ordering lengths and structures can be independently modified by choosing a different mold pattern, latex spheres with different diameters, and/or amphiphilic block copolymers with different architectures, molecular weight or concentrations. Furthermore, the composition of the inorganic framework can be altered by using appropriate sol-gel inorganic precursor species, e.g, $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, $Al_2TiO_5$, and even sulfides. [See, P. Yang, et al., Nature, Vol. 396, 152 (1998)].

These materials possess both biomimetic significance and technological importance. The ease, reproducibility, and versatility of this synthetic approach facilitates the development of new materials with a variety of compositions, and offers far-ranging possibilities for tuning electronic, optical, and magnetic properties over several length scales independently. For example, hierarchically ordered titania may exhibit tunable photonic band gaps. Foreseeable technological applications of these materials include quantum optics or optical communications, large molecular catalysis, separation, host-guest systems, porous electrodes, and sensors.

The following references are incorporated herein by reference: A. Aksay, et al., Science, 273, 892 (1996); X. Bu, et al., Science, 278, 2080 (1997); C. T. Kresge, et al., Nature, 359, 710 (1992); D. Zhao, et al., Science, 279, 548 (1998); P. Yang, et al., Science, Vol. 282, 2244 (1998); P. Yang, et al., Nature, Vol. 396,152 (1998); A. Firouzi, et al., J. Am. Chem. Soc. 119, 9466 (1997); S. H. Tolbert, et al., Science, 278, 264 (1997); D. Velev, et al., Nature, 389, 447 (1997); M. Antonietti, et al., Adv. Mater. 10, 154 (1998); B. T. Holland, et al., Science, 281, 538 (1998); J. E. G. J. Wijnhoven, et al., Science, 281, 802 (1998); Y. Xia, et al., Angew. Chem. Int. Ed. 37, 550 (1998); E. Kim, et al., Adv. Mater. 8, 245 (1996); C. Marzolin, et al., Adv. Mater. 10, 571 (1998); H. Yang, et al., Adv. Mater. 9, 811 (1997); M. Trau, et al., Nature, 390, 674 (1997); Q. Huo, et al., Nature, 368, 317 (1994); D. Zhao, et al., Adv. Mater., Vol. 10, 1380 (1998); S. L. Keller, et al., Phys. Rev. Lett. 80, 2725 (1998); Q. Huo, et al., Adv. Mater. 9, 974 (1997); M. E. Gimon-Kinsel, et al., Stud. Surf. Sci. Cata. 117, 111 (1998); and A. van Blaaderen, et al., Nature, 385, 321 (1997).

Although the foregoing invention has been described in some detail by way of illustration and example for purposes of clarity and understanding, it will be obvious that various modifications and changes which are within the knowledge of those skilled in the art are considered to fall within the scope of the appended claims.

TABLE 1

| System | Inorganic Precursor | Aging Temperature, °C. | Aging time (day) | d (Å) |
|---|---|---|---|---|
| Zr | $ZrCl_4$ | 40 | 1 | 125 |
| Ti | $TiCl_4$ | 40 | 7 | 123 |
| Al | $AlCl_3$ | 40 | 2 | 130 |
| Si | $SiCl_4$ | 40 | 2 | 171 |
| Sn | $SnCl_4$ | 40 | 2 | 124 |
| Nb | $NbCl_5$ | 40 | 2 | 106 |
| Ta | $TaCl_5$ | 40 | 2 | 110 |
| W | $WCl_6$ | 60 | 15 | 126 |
| Hf | $HfCl_4$ | 40 | 1 | 124 |
| Ge | $GeCl_4$ | 40 | 15 | 146 |
| V | $VCl_4$ | 60 | 7 | 111 |
| Zn | $ZnCl_2$ | 60 | 30 | 120 |
| Cd | $CdCl_2$ | 40 | 7 | 111 |
| In | $InCl_3$ | 60 | 30 | 124 |
| Sb | $SbCl_5$ | 60 | 30 | 93 |
| Mo | $MoCl_5$ | 60 | 7 | 100 |
| Re | $ReCl_5$ | 60 | 7 | 121 |
| Ru | $RuCl_3$ | 40 | 3 | 95 |
| Ni | $NiCl_2$ | 40 | 2 | 100 |
| Fe | $FeCl_3$ | 40 | 7 | 116 |
| Cr | $CrCl_3$ | 40 | 4 | 117 |
| Mn | $MnCl_2$ | 40 | 7 | 124 |
| Cu | $CuCl_2$ | 40 | 7 | 98 |
| SiAl | $AlCl_3/SiCl_4$ | 40 | 2 | 120 |
| $Si_2Al$ | $AlCl_3/SiCl_4$ | 40 | 2 | 120 |
| ZrTi | $ZrCl_4/TiCl_4$ | 40 | 2 | 110 |
| $Al_2Ti$ | $AlCl_3/TiCl_4$ | 40 | 7 | 112 |
| SiTi | $SiCl_4/TiCl_4$ | 40 | 3 | 103 |
| $ZrW_2$ | $ZrCl_4/WCl_6$ | 40 | 3 | 140 |
| SnIn | $SnCl_4/InCl_3$ | 40 | 30 | 83 |

What is claimed is:

1. A method of forming a multi-scale mesoscopically structured material, comprising:
   contacting a mold, having a first open end and a second open end, with a substrate;
   filling said mold with a latex colloidal suspension comprising microspheres;
   removing solvent from the suspension to create a close-packed array of microspheres having interstitial spaces between the microspheres;
   combining an amphiphilic block copolymer with an inorganic metal compound; and
   filling the interstitial spaces between the microspheres in said mold with said combination whereby the block copolymer and inorganic metal compound are self-assembled and polymerized into a mesoscopically structured material exhibiting multiple structural ordering length scales.

2. The method of claim 1, wherein said structural ordering length scales are approximately 10, 100, and 1000 mm.

3. The method of claim 1, further comprising removing said mold to form both a mesoporous and macroporous material.

4. The method of claim 1, wherein said block copolymer is a triblock copolymer.

5. The method of claim 4, wherein said triblock copolymer is a poly(ethylene oxide)-poly(alkylene oxide)-poly(ethylene oxide) polymer where the alkylene oxide moiety has at least three carbon atoms.

6. The method of claim 4, wherein said triblock copolymer is poly(ethyleneoxide)-poly(propyleneoxide)-poly(ethyleneoxide).

7. The method of claim 1, wherein said mesoscopically structured material has a cubic mesostructure.

8. The method of claim 1, wherein said mesoscopically structured material has a hexagonal mesostructure.

9. The method of claim 1, wherein said inorganic metal compound is a transition metal compound.

10. The method of claim 1, wherein said inorganic metal compound is a sulfide.

11. The method of claim 1, wherein said metal compound, upon calcination, forms an oxide selected from $Nb_2O_5$, $TiO_2$, $ZrO_2$, $WO_3$, $AlSiO_{3.5}$, $AlSiO_{5.5}$, $SiTiO_4$, $Al_2O_3$, $Ta_2O_5$, $SiO_2$, $SnO_2$, $HfO_2$, $ZrTiO_4$, and $Al_2TiO_5$.

12. The method of claim 1, wherein said amphiphilic block copolymer and said inorganic metal compound combine to form a sol.

13. The method of claim 1, further comprising after polymerizing the mesoscopically structured material, of removing said mold to form a mesoporous material.

14. The method of claim 1, further comprising after polymerizing the mesoscopically structured material, calcining said material to remove said amphiphilic block copolymer thereby to form a mesostructured material with a multiple length scale.

15. A method of forming a multi-scale mesoscopically structured material, comprising:

placing a mold, having a first open end and a second open end, on a substrate;

filling said mold with a latex colloidal suspension comprising microspheres;

removing solvent from the suspension to form a close-packed array of microspheres having interstitial spaces between the microspheres within the mold;

creating a sol in which an amphiphilic block copolymer is combined with an inorganic precursor compound; and filling the interstitial spaces between the microspheres in said mold with said sol whereby the block copolymer and inorganic metal compound are self-assembled and polymerized into a mesoscopically structured material exhibiting multiple structural ordering length scales.

* * * * *